Figure 1:
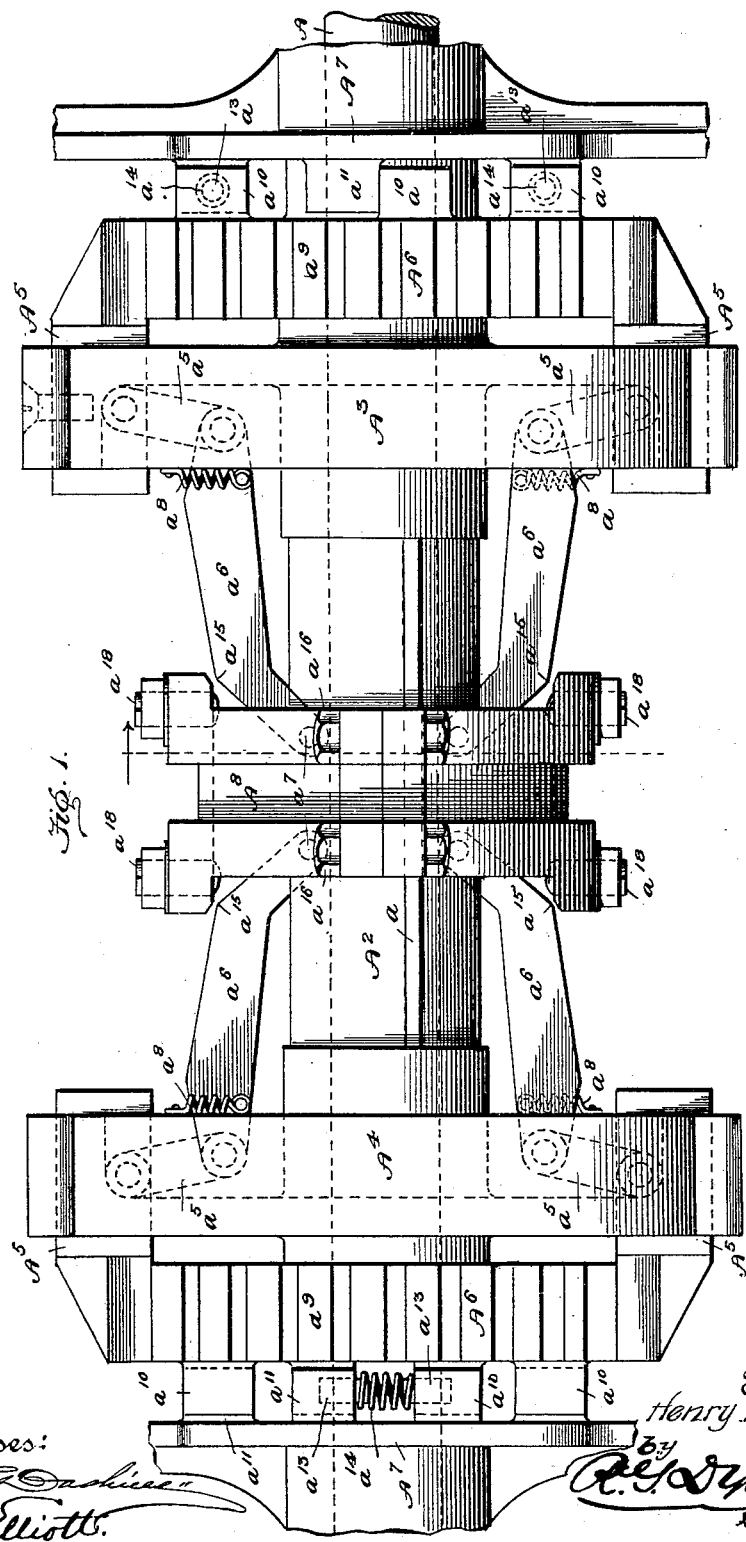

No. 638,637. Patented Dec. 5, 1899.
H. T. LA CLAIR.
CLUTCH.
(Application filed Nov. 23, 1898.)

(No Model.) 3 Sheets—Sheet 2.

Witnesses:

Inventor:
Henry T. La Clair,
by R. S. Dyrenforth,
his attorney

No. 638,637. Patented Dec. 5, 1899.
H. T. LA CLAIR.
CLUTCH.
(Application filed Nov. 23, 1898.)
(No Model.) 3 Sheets—Sheet 3.
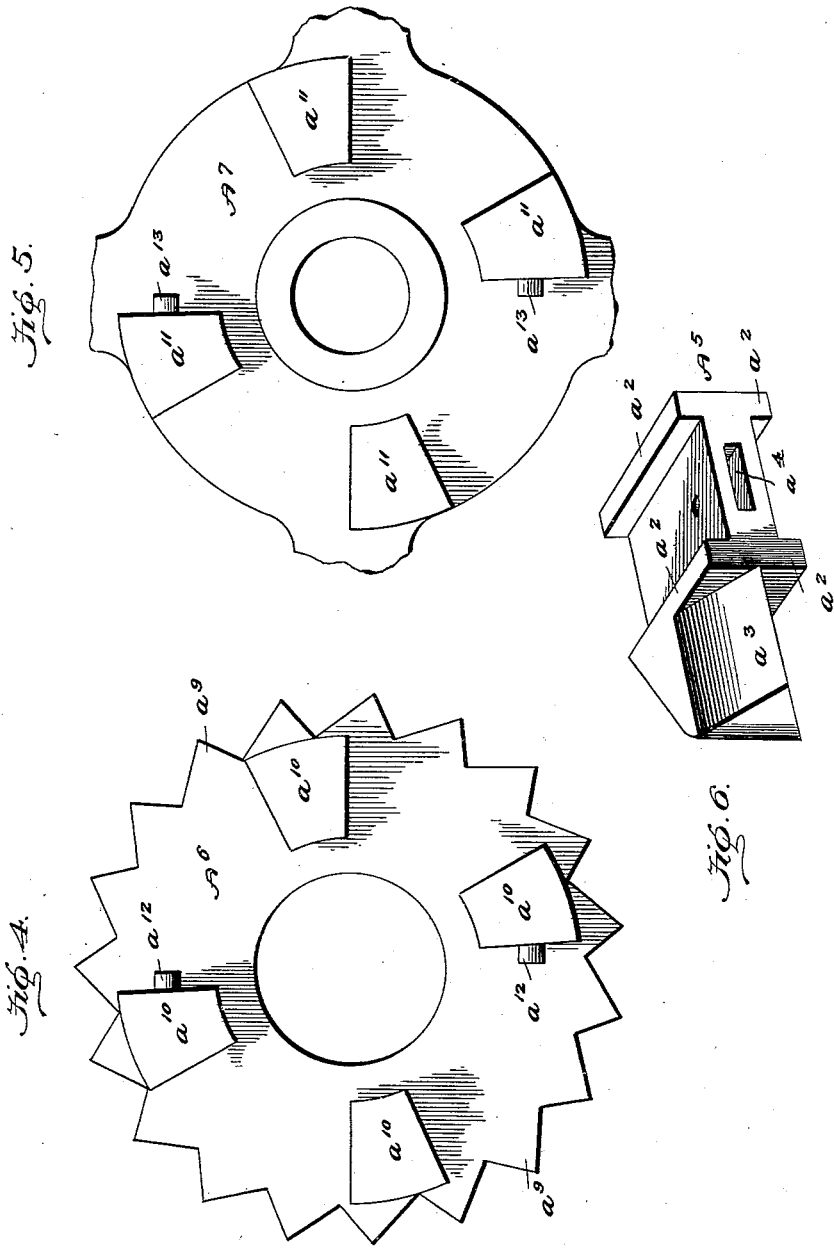
Witnesses:
Inventor:
Henry T. La Clair
by
his attorney

UNITED STATES PATENT OFFICE.

HENRY T. LA CLAIR, OF WASHINGTON, DISTRICT OF COLUMBIA.

CLUTCH.

SPECIFICATION forming part of Letters Patent No. 638,637, dated December 5, 1899.

Application filed November 23, 1898. Serial No. 697,257. (No model.)

*To all whom it may concern:*

Be it known that I, HENRY T. LA CLAIR, a citizen of the United States, residing at Washington, in the District of Columbia, have invented certain new and useful Improvements in Clutches; and I do hereby declare the following to be a full, clear, and exact description of the invention, such as will enable others skilled in the art to which it appertains to make and use the same.

The object is to present a clutch adapted more particularly for use in connection with planing-machines, although equally adaptable to any mechanism wherein a reverse motion is desired, in which upon reversal of the parts all jar and impact will be taken up, thereby reducing danger of breakage or injury of the parts to a minimum and preventing the highly-objectionable rattle and noise which accompany the use of ordinary clutches of this character; furthermore, to present a clutch in which the clutching and unclutching may be effected with readiness and ease irrespective of the speed at which the shaft carrying the same may be driven, and, finally, to present a clutch which shall combine the highest durability and efficiency in use, simplicity in construction, and cheapness of manufacture, and one which in case of injury may readily be repaired.

Briefly stated, the clutch characterized by my invention comprises two clutch heads or disks carried by a common sleeve, the latter to be keyed or otherwise suitably secured to the driven shaft. These clutch-heads carry each in this instance two dogs, which are normally held outward toward the periphery of the heads and are adapted to move inward toward the shaft for the purpose of effecting the locking together of the parts to be driven by any suitable means—in this instance by a sliding collar, which may be operated by an ordinary shifting-lever, as is common. The locking mechanism with which the dogs engage at each end of the clutch consists of a clutch member provided at its periphery with approximately V-shaped or saw-shaped teeth and at one side with outwardly-projecting lugs, which engage with similar lugs or bosses carried by another clutch member, the two clutch members being normally free to rotate on the driven shaft. The lugs or bosses of the respective clutch members at each end of the clutch are always interlocked—that is to say, the lugs on one member project into the space between the lugs of the other member—so that lateral movement of these parts to effect proper locking is rendered unnecessary. To take up the shock and jar incident to unlocking one set of clutch members and locking another, I interpose any suitable buffer device between the lugs—in this instance a coiled spring, the end turns of which are to engage the one with a pintle projecting from the lug on one clutch-face and the other with a pintle projecting from the lug on the other clutch member, so that when the locking of the parts is effected these springs will take up and absorb the initial jar, and thus obviate rattling and noise.

As a means of bringing the dogs into engagement with the teeth of the respective clutch members I illustrate in this instance two arms for each clutch-head, these arms being fulcrumed on or pivoted to the sleeve at one end and connected by a link with the dogs at the other end, springs secured to the clutch-head and to the arms serving normally to hold the dogs out of engagement with the teeth of the clutch members. These arms are by preference approximately L-shaped, and the bends are engaged by suitable projections on the collar, so that when the latter is initially shifted the dogs will be rapidly drawn into engagement with the teeth of the clutch member, thereby to prevent stripping or breaking of the teeth of the same, and upon further movement by riding upon the straight portion of the arms will serve to lock and hold the dogs in engagement with the said teeth.

All the parts of the device are to be constructed of any suitable material possessing the requisite rigidity and strength to oppose the strain to which they will be subjected in use.

Figure 2:
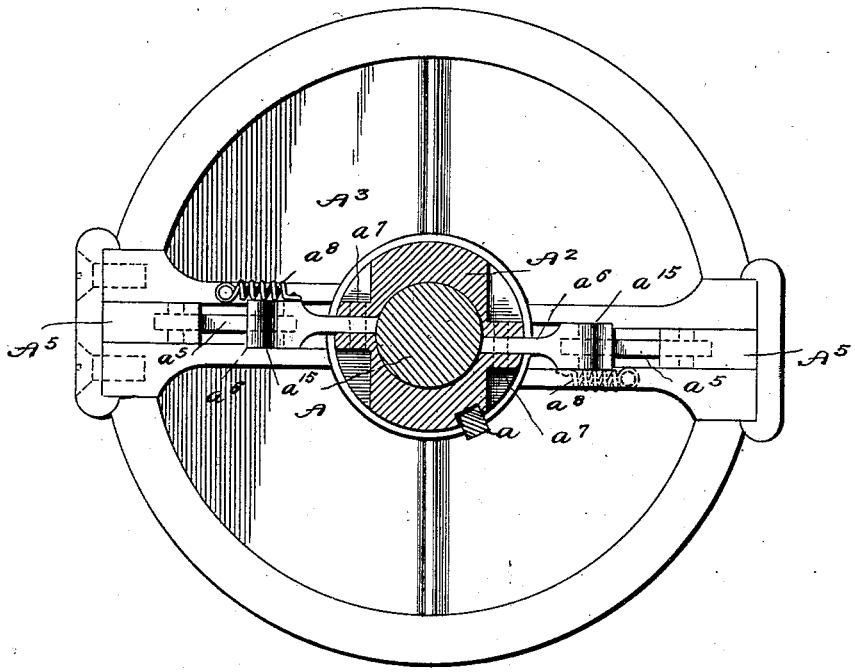
Figure 3:
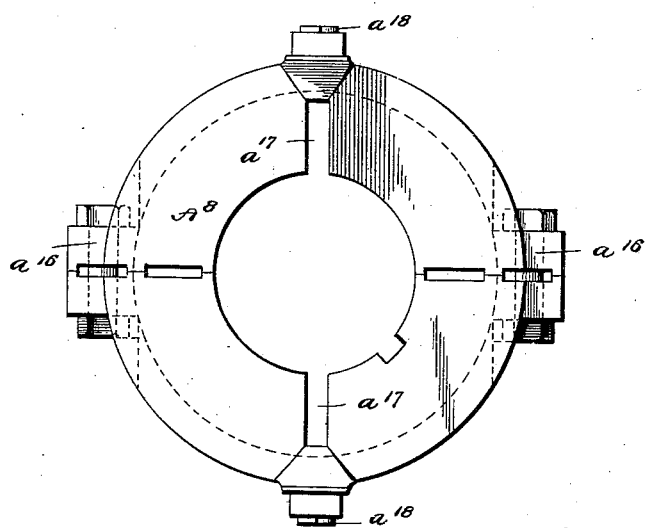

In the accompanying drawings, forming a part of this specification, and in which like letters of reference indicate corresponding parts, Figure 1 is a view in side elevation displaying the clutch as it appears when set up for use. Fig. 2 is a view in transverse section looking in the direction of the arrow in Fig. 1, the shifting collar being removed, showing more particularly the manner in which the dog-operating arms are supported. Fig. 3 is a view in elevation of the shifting collar. Figs. 4 and 5 are views in elevation of the two clutch members, and Fig. 6 is a detached detail view in perspective showing the peculiar shape of one of the locking-dogs.

Referring to the drawings, A designates a shaft constituting the driving member, which may be connected with any suitable mechanism to be operated, and therefore needs no further description. Upon this shaft is mounted a sleeve $A^2$, the same being held in position thereon against independent rotary motion by a key $a$. (Indicated in full lines in Fig. 1 and in section in Fig. 2.) This sleeve carries at its respective ends clutch heads or disks $A^3$ $A^4$, (clearly shown in Fig. 2,) these heads to be cast integral with the sleeve or to be secured thereto in any suitable manner. Each disk has at diametrically opposite sides a recess, in which is mounted a dog $A^5$, the same, as shown in Fig. 6, consisting of a body portion having side flanges $a^2$ to overlap and work against the walls of the recess and a wedge-shaped projection $a^3$, constituting the dog proper. The dog is provided with a rectangular opening or seat $a^4$, in which is pivoted one end of a link $a^5$, the other end of the link being pivoted to one end of an arm $a^6$, the other end of which is pivotally connected with the sleeve $A^2$, in this instance by milling out a groove in the sleeve for the reception of such end of the arm and then passing a transverse pin through the arm, as shown in dotted lines at $a^7$ in Figs. 1 and 2. Each dog is held normally toward the periphery of the clutch-head by a spring $a^8$, one end being connected to the clutch-head and the other end to the arm. It is to be understood that the parts of this device are in duplicate, so that a description of one will serve for all.

Loosely mounted upon the shaft adjacent to the clutch-head are two clutch members $A^6$ $A^7$, the clutch member $A^6$ being provided at its periphery with saw-shaped teeth $a^9$ and at its side with keystone-shaped lugs or bosses $a^{10}$ and the member $a^7$ being provided on the face that opposes the member $A^6$ with keystone-shaped lugs or bosses $a^{11}$, which interlock with those of the member $A^6$.

In order to take up and absorb all jars and shock when the clutch is reversed, I provide in this instance two oppositely-alined lugs on the member $A^6$, with pintles $a^{12}$ extending parallel to the face of the member and the member $A^7$ with similar pintles $a^{13}$, and on these pintles are arranged coiled springs $a^{14}$, operating normally to hold the lugs out of engagement with each other. The arms $a^6$ are, as shown in Fig. 1, approximately elbow-shaped, with the bends $a^{15}$ disposed away from the sleeve, thus to present to the shifting collar $A^8$ an abrupt wedge-surface, which will upon the initial movement of the collar quickly operate to cause the arms $a^6$ to be drawn into engagement with the teeth of the clutch member $A^6$, and upon further movement of the same upon the tapered portions of the arms the dogs will be locked and held firmly in engagement with the teeth of the member $A^6$. The collar $A^8$ is constructed of two sections held together by bolts $a^{16}$, as shown in Figs. 1 and 3, and is provided with slots $a^{17}$, in which the arms work, as shown in Fig. 3. In direct alinement with each slot $a^{17}$ is a bolt $a^{18}$, adapted to be turned inward to bring its inner end into position to engage with the arms, and by this arrangement lost motion and wear may readily be taken up.

In operation, the parts of the clutch being in the position shown in Fig. 1—that is, with the dogs $A^5$ out of engagement with the teeth of the members $A^6$—the collar $A^8$ is shifted, by any suitable form of shifting-lever, say, to the right. This movement will cause the inner ends of the bolts $a^{18}$ to ride up upon the elbows of the arms $a^6$, and thereby close the arms in toward the sleeve $A^2$ and exert a downward pull upon the links $a^5$, thus moving the dogs into engagement with the teeth of the member $A^6$. As soon as this takes place the member $A^6$ becomes fixed upon the shaft and immediately begins to turn and imparts motion to the member $A^7$ and the latter to the part to be driven. As the lugs or bosses $a^{10}$ are moved toward each other when the parts of the clutch are locked, the jar which would otherwise occur is absorbed and taken up by the springs $a^{14}$. Now should it be desired to lock the clutch on the left-hand side into engagement it will be seen that there will be no resistance presented to the collar to bring about this result, as by reason of the shape of the dogs and the teeth in the member $A^6$ instant separation of these parts may be effected. In fact, by their very contour should the collar work to the center of the sleeve the dogs and the clutch member $A^6$ would automatically disengage themselves, first, by reason of the shape of the dog and the teeth of the said member, and, further, by the tension exerted by the springs $a^8$ upon the arms $a^6$.

Having thus fully described my invention, what I claim as new, and desire to secure by Letters Patent, is—

A clutch comprising two clutch-heads fixed with relation to a shaft on which they are mounted, a shifting collar movable between the clutch-heads, two clutch members, mounted adjacent to each clutch-head, and normally loose on the shaft, said members being each provided with outwardly-disposed lugs adapted to interlock with each other, springs mounted between the lugs to take up shock and jar upon reversal of the clutch, dogs carried by the clutch-heads to engage with teeth formed on the periphery of one of each of the clutch members, said dogs being normally out of engagement with the said teeth, arms pivoted at one end in the path of movement of the shifting collar, and at the other end by links to the dogs, and springs connecting with the clutch-heads and the arms, whereby to keep the dogs normally out of engagement with the teeth in the clutch members, substantially as described.

In testimony whereof I affix my signature in presence of two witnesses.

HENRY T. LA CLAIR.

Witnesses:
R. M. ELLIOTT,
E. T. BRANDENBURG.